United States Patent [19]
Haglund et al.

[11] 3,799,034
[45] Mar. 26, 1974

[54] ROTARY FLUID DEVICE

[75] Inventors: Robert J. Haglund; James A. Steele, both of Birmingham, Mich.

[73] Assignee: General Motors Corporation, Detroit, Mich.

[22] Filed: Oct. 6, 1972

[21] Appl. No.: 295,548

[52] U.S. Cl................................................. 91/490
[51] Int. Cl............................................. F01b 13/04
[58] Field of Search............ 91/490, 491, 493, 495; 92/169, 171, 246; 417/460, 467, 469

[56] References Cited
UNITED STATES PATENTS

| | | | |
|---|---|---|---|
| 3,530,768 | 9/1970 | Engel | 91/491 |
| 3,274,946 | 9/1966 | Simmons | 91/486 |
| 3,656,407 | 4/1972 | Hause | 91/490 |
| 3,577,830 | 5/1971 | Ortelli | 92/72 |
| 2,815,718 | 12/1957 | Avery | 91/498 |
| 2,654,646 | 10/1953 | Lldseen | 92/246 |
| 3,396,711 | 8/1968 | Fangman et al. | 92/171 |

FOREIGN PATENTS OR APPLICATIONS

| | | | |
|---|---|---|---|
| 388,521 | 3/1933 | Great Britain | 91/496 |

*Primary Examiner*—William L. Freeh
*Assistant Examiner*—Gregory La Pointe
*Attorney, Agent, or Firm*—Herbert Furman

[57] ABSTRACT

A rotary fluid device includes a rotor mounted eccentrically within an annular race of a housing by a stator having fluid ports. A plurality of radial pistons circumferentially spaced about the rotor have spherical portions at their outer ends and define radial fluid passages that communicate with the fluid ports of the stator during rotation of the rotor. A plurality of composite cups are respectively associated with the pistons, and each includes an annular cylinder member with an inner annular surface that slidably receives the spherical portion of the associated piston and a shoe member that closes the outer end of the cylinder member and has an arcuate surface slidably engaging the annular race of the housing. Pressurized fluid received within the piston and cup arrangements during operation of the rotary fluid device acts on the cups to maintain them radially balanced relative to the housing race. The shoe members of the cups have portions that are plastically deformed over annular attachment flanges of the cylinder members to secure these members to each other. This securement allows the cylinder members to elastically deform independently of the shoe members under the impetus of the pressurized fluid such that the pistons and their associated cylinder members elastically deform in a coordinated manner to prevent fluid leakage at their sliding interfaces. In another embodiment, split washer type fittings are snapped over portions of the shoe members and engage the annular attachment flanges of the cylinder members to allow this coordinated elastic deformation. The wall thickness of the cylinder members varies to provide annular ribs intermediate the ends of these members for controlling their elastic deformation characteristics and coordinating them with the pistons. The pistons are slightly less rigid than the cylinder members such that the pressurized fluid produces a normal force at the sliding interfaces of these components to substantially eliminate any fluid leakage at these interfaces. Generally conical displacement members are mounted on the shoe members pointing inwardly and reduce the volume within the piston and cup arrangements to consequently reduce compressibility losses during operation of the fluid device.

8 Claims, 4 Drawing Figures

PATENTED MAR 26 1974　　　　　　　　　　3,799,034

1

ROTARY FLUID DEVICE

BACKGROUND OF THE INVENTION

This invention relates generally to a rotary fluid device for use as a pump and/or a motor.

The structure of a rotary fluid device generally includes a housing defining an annular race in which a stator rotatably mounts a rotor eccentrically relative to the central axis of the annular race. A plurality of piston and cylinder arrangements are circumferentially spaced about the rotor and have their internal portions communicated with fluid ports of the stator during the rotation of the rotor. The piston and cylinder arrangements include shoe portions which slidably engage the annular race of the housing. Due to the eccentric positioning of the axis of rotation of the rotor relative to this race, the piston and cylinder arrangements reciprocate during this rotational movement.

When operating as a pump, a torque is supplied to the fluid device to rotate the rotor. A source of fluid is supplied through a fluid inlet port of the stator to the internal portions of the piston and cylinder arrangements as they are extending such that the fluid is drawn to within the arrangements. The fluid is then compressed by retraction of the piston and cylinder arrangements and is forced out a fluid outlet port of the pump.

When the fluid device operates as a motor, pressurized fluid is supplied through a fluid inlet port of the stator to the piston and cylinder arrangements in their retracted positions. The eccentricity of the axis of rotation of the rotor relative to the annular race of the housing causes this fluid pressure supply to move the piston and cylinder arrangements to their extended positions and to concomitantly rotate the rotor. The piston and cylinder arrangements exhaust the pressurized fluid to an outlet port of the stator just after reaching their fully extended positions. This exhaust of the pressurized fluid allows the piston and cylinder arrangements to again move to their retracted positions under the impetus of the rotational movement of the rotor.

The piston and cylinder arrangements for the most part in the past have been constituted by portions of the rotor which define the cylinders, and by pistons which have outer ends providing the shoe portions that slidably engage the annular race of the housing and which have spherical inner ends slidably received by the associated cylinders of the rotor. This type of piston and cylinder arrangement, as a result of the eccentric relationship of the components of the fluid device, causes the pressurized fluid within the arrangements to act on the pistons and supply a resultant force tending to tip the pistons radially relative to the annular housing race. This tipping action supplies a greater pressure between the race and shoe portions at either their leading or lagging edges than is present at their opposite edges and causes a radial unbalance which can prevent effective operation of the fluid device.

The piston and cylinder arrangements have also been constituted by pistons extending from the rotor and having spherical portions on their outer ends, and by cups which have cylinder portions slidably receiving the outer ends of the pistons and have shoe portions closing the outer ends of the cylinder portions and slidably engaging the annular race of the housing. The sliding interface between the spherical portion of the piston and the cup in this type of arrangement, which may be referred to as a piston and cup arrangement, is constantly normal to the central axis of the cylinder portion which extends radially relative to the annular housing race. Consequently, pressurized fluid within this type of arrangement does not produce a radial unbalance tending to tip the cup and cause the increased pressure between the housing race and either the leading or lagging end of the shoe portion. The piston of this radially balanced piston and cup arrangement is open at its outer end to provide a fluid passage which communicates the internal portion of the arrangement with the fluid ports of the stator. The inner end of the cylinder portion of the cup is likewise open, but the cup is closed at the outer end of the cylinder portion by the shoe portion. Consequently, the inner end of the cup is more flexible than its outer end, and pressurized fluid within the arrangement will elastically deform the inner end more than the outer end. Thus, it is difficult to provide coordinated elastic deformation of the piston and the cylinder portion of the cup to prevent fluid leakage at the sliding interface between these components of the fluid device as they reciprocate relative to each other.

SUMMARY OF THE INVENTION

One feature of this invention is that it provides an improved rotary fluid device with a housing defining an annular race in which a stator eccentrically mounts a rotor that supports outwardly extending pistons defining radial fluid passages and having spherical portions on their outer ends that are slidably received by the inner ends of cylinder members whose outer ends are closed by shoe members slidably engaging the housing race, and the attachment between these members provides composite cups which allow pressurized fluid within the piston and cup arrangements to elastically deform the pistons and cylinder members in a coordinated manner to prevent fluid leakage at their sliding interface. Another feature of the invention is that the cylinder members of the composite cups have elongated annular configurations with a wall thickness that varies along their longitudinal lengths to control the elastic deformation characteristics of these members when subjected to the pressurized fluid. Another feature of the invention is that the varying wall thickness of each cylinder member provides an annular rib intermediate the inner and outer ends of the member. Another feature of the invention is that the pistons are slightly less rigid than the cylinder members of the cups such that the pressurized fluid causes a normal force at the sliding interface between these components to substantially eliminate fluid leakage. Another feature of the invention is that each composite cup may have the outer end of its cylinder member secured to the associated shoe member by plastically deforming a portion of one of the members over a portion of the other member to prevent movement of the cylinder member relative to the shoe member in a direction along the longitudinal axis of the cylinder member but to allow elastic deformation of the cylinder member radially outward of this axis independently of the shoe member under the impetus of the pressurized fluid within the piston and cup arrangement. Another feature of the invention is that each composite cup may have the outer end of its cylinder member secured to its shoe member by snapping a fitting over a portion of one of the members such that the fitting engages a portion of the other member to prevent movement of the cylinder member relative to the shoe member in a direction along the longitudinal axis of the cylinder member but to allow the elastic deformation of the cylinder member raidally outward of this axis independently of the shoe member under the impetus of pressurized fluid within the piston and cup arrangement. Another feature of the invention is that a displacement member may be mounted on the shoe member and extend inwardly such that the volume of fluid within the piston and cup arrangement is reduced to reduce compressibility losses resulting from operation of the fluid device. Another feature of the invention is that the displacement member may have a conical configuration with its base portion mounted on the shoe member and with its apex portion moving within the fluid passage of the associated piston during the operation of the fluid device.

DESCRIPTION OF THE DRAWINGS

The above specified features and other features of this invention are readily apparent from the following description of the preferred embodiments and the drawings in which.

DESCRIPTION OF THE PREFERRED EMBODIMENTS

Figure 1:
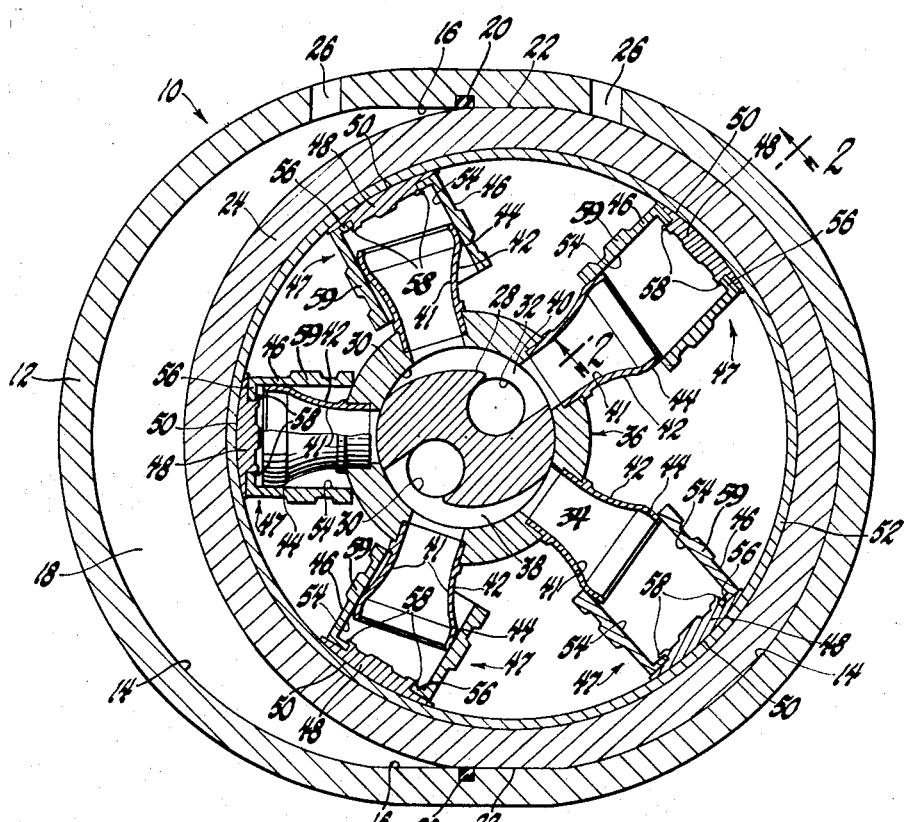
FIG. 1 is a sectional view taken through a rotary fluid device whose pistons are slidable in cylinder members which are secured to race engaging shoe members to provide piston and composite cup arrangements according to this invention.

Referring to FIG. 1 of the drawings, a rotary fluid device is generally indicated by 10 and includes a fixed housing 12 with opposed semicircular surfaces 14 connected by upper and lower flat surfaces 16 to provide an oblong cavity 18. The housing 12 supports upper and lower seals 20 intermediate the ends of the flat surfaces 16 and these seals engage upper and lower flat surfaces 22 of movable housing 24 which has a generally annular configuration. The fixed housing 12 includes fluid ports 26 at its upper sides for allowing a pressurized fluid or a vacuum to locate the movable housing at either of the opposite ends of the fixed housing or at some intermediate position between these extremes. This positioning controls the degree to which fluid is pressurized when the fluid device is used as a pump and controls the revolutions of the device per unit flow of pressurized fluid when it is used as a motor, as will become apparent.

Figure 2:
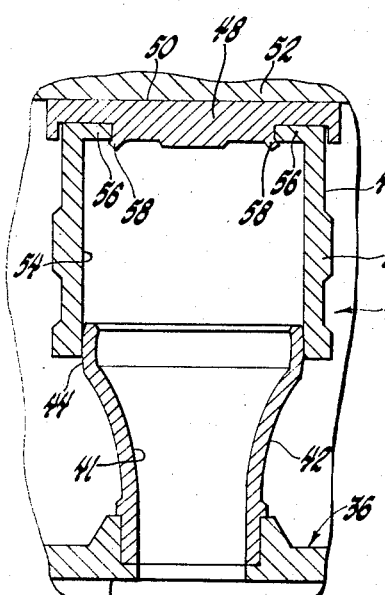
FIG. 2 is a sectional view taken through one of the piston and composite cup arrangements generally along line 2—2 of FIG. 1 and shows the manner in which portions of the shoe member are plastically deformed over an annular flange of the cylinder member to provide attachment of these members of the composite cup.

A stator 28 is mounted stationary relative to the fixed housing 12 and includes fluid ports 30 and 32 which extend axially relative to the stator. An outer annular bearing surface 34 of the stator rotatably supports a rotor indicated generally by 36. The stator 28 includes grooves 38 and 40 which extend circumferentially relative to the stator and communicate the fluid ports 30 and 32 with the radially extending fluid passages 41 defined by a plurality of circumferentially spaced pistons 42 that extend radially outward from the rotor. The pistons 42 include spherical portions 44, see also FIG. 2, at their outer ends. These spherical portions are slidably received by the inner ends of elongated annular cylinder members 46 of composite cups 47. The composite cups also include shoe members 48 which close the outer ends of the cylinder members 46 and have arcuate bearing surfaces 50 slidably engaging an annular bearing race 52 within movable housing 24. Although it is not shown in the drawings, the shoe members 48 may also include lubrication ports which extend radially relative to the annular race 52 so as to allow a small portion of the pressurized fluid received within the piston and composite cup arrangements during operation of the fluid device to lubricate the sliding interfaces between the bearing surfaces 50 of the shoe members and the bearing race 52.

The shoe members 48 constantly position the composite cups 47 with the central longitudinal axes of the cylinder members 46 oriented radially relative to bearing race 52. Since the sliding interfaces between the spherical portions 44 of the pistons 42 and the inner annular surfaces 54 of the cylinder members 46 are located within planes oriented normal to these axes, pressurized fluid received within the piston and composite cup arrangements does not produce a resultant force on the cups 47 that tends to tip them radially relative to bearing race 52. Thus, the pressure between the shoe members 48 and bearing race 52 is generally the same at the opposite circumferential ends of bearing surfaces 50, and this radially balanced condition of the composite cups insures effective operation of the fluid device 10.

When the rotary fluid device 10 is utilized as a pump, the fluid inlet supply is through fluid port 32 with the rotor 36 rotating clockwise or, alternately, the fluid supply is through fluid port 30 with the rotor rotating counterclockwise. The eccentricity of the axis of rotation of the rotor 36 relative to the bearing race 52 causes the composite cups 47 to slide outwardly on pistons 42 during a portion of the rotational movement and to draw the supplied fluid into the piston and composite cup arrangements. This captured fluid is subsequently pressurized as the cups slide inwardly on pistons 42 during another stage of the rotational movement and is forced out the other fluid port of the fluid device at an increased state of pressure. The eccentricity of the axis of rotation of the rotor reative to bearing race 52 controls the degree of reciprocation of the cups on the pistons and, consequently, varies the flow characteristics of the pump.

When the rotary fluid device is utilized as a motor, pressurized fluid supplied to either fluid port 30 or 32 urges the retracted piston and cup arrangements toward their extended positions and, consequently, rotates the rotor 36. This rotation will be counterclockwise when the pressurized fluid is supplied through port 30 and clockwise when it is supplied through port 32. The piston and cup arrangements exhaust the pressurized fluid through the opposite port to the one through which it is supplied, and this exhaust occurs just after the arrangements reach their extended positions. This exhaust thus allows the cups 47 to slide inwardly to become ready for subsequent outward movement under the impetus of the supplied pressurized fluid.

The cylinder members 46 and shoe members 48 of cups 47 are secured relative to each other by way of annular attachment flanges 56 at the outer ends of cylinder members 46. The shoe members 48 have portions 58 which are plastically deformed over the inner sides of attachment flanges 56 to prevent movement of these members relative to each other along the longitudinal axes of the cylinder members 46. However, the cylinder members 46 are free to expand radially outward relative to their central longitudinal axes independent of any elastic deformation of the shoe members. Consequently, it is possible to coordinate the elastic deformation characteristics of the pistons 42 and the cylinder members 46 at their sliding interface under the impetus of pressurized fluid received within the piston and composite cup arrangements. This coordination allows the composite cups 47 to reciprocate on the pistons 42 without any fluid leakage at their sliding interface. If the outer ends of the cylinder members were closed by integral portions of these members, the cylinder members would be more rigid at their outer ends than at their inner ends. However, the rigidity of the pistons is constant and the coordinated elastic deformation would thus not be possible with this type of cup. The pistons are just slightly less rigid than the cylinder members 46 such that the pressurized fluid within the piston and composite cup arrangements tends to expand the pistons more than the cylinder members and produces a normal force at the sliding interface of these components. This normal force substantially eliminates any fluid leakage at this interface. The wall thickness of cylinder members 46 is varied to provide annular ribs 59 intermediate the inner and outer ends of these members. These ribs control the elastic deformation characteristics of the cylinder members to coordinate deformation of these members with that of the open ended pistons 42. This wall thickness may be varied to provide other configurations of the cylinder members depending upon the requirements dictated by the deformation characteristics of the pistons utilized.

Figure 3:
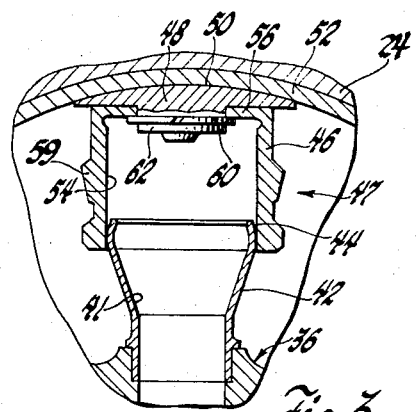
FIG. 3 is a sectional view taken through another embodiment of the invention in the same direction as FIG. 1 and shows a split washer type fitting which is snapped over a portion of the shoe member and engages an annular flange of the cylinder member to provide the attachment between these members of the composite cup.

In the embodiment shown in FIG. 3, a split washer type attachment fitting 60 is snapped into an annular groove in an embossment 62 on the shoe member 48. The outer edge of this fitting engages the annular attachment flange 56 of the associated cylinder member 46 to secure these members against movement relative to each other along the longitudinal axis of the cylinder member. However, the cylinder member 46 is allowed to expand radially outward relative to this axis to provide the coordinated elastic deformation of the cylinder member with the piston 42 independent of any deformation of the shoe member.

Figure 4:
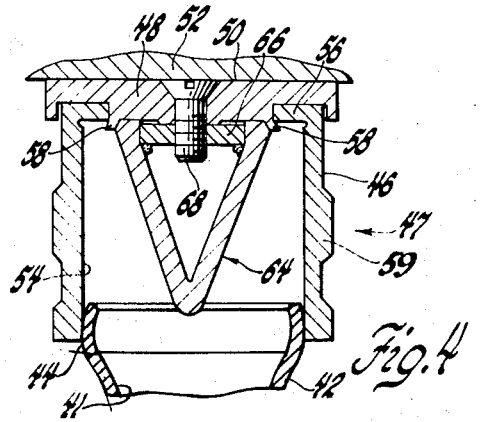
FIG. 4 is a sectional view of another embodiment of the invention taken in the same direction as FIG. 2 and shows a displacement member which is mounted on the shoe member and reduces the volume of fluid received within the piston and composite cup arrangement to reduce compressibility losses.

The embodiment of the piston and composite cup arrangement shown in FIG. 4 includes a generally conical displacement member indicated by 64. This displacement member includes a base portion 66 which is welded or otherwise suitably secured to the conical portion1 of the displacement member and includes a threaded hole receiving a bolt 68 which extends inwardly from the outer surface 50 of the shoe member 48. The apex portion of the displacement member moves within the fluid passage 41 of the piston 42 during reciprocal movement of the arrangement and reduces the volume of fluid received within the arrangement to reduce compressibility losses that occur during operation of the fluid device 10.

The invention thus provides an improved rotary fluid device.

What is claimed is:

1. A rotary fluid device comprising:
a housing defining an annular race;
a stator mounted on the housing and defining fluid ports;
a rotor mounted on the stator for rotational movement about an axis located eccentrically relative to the central axis of the annular race;
a plurality of radial pistons extending outwardly from the rotor and having spherical portions at their outer ends, the pistons defining radially extending fluid passages whose outer ends are open and whose inner ends communicate with the fluid ports of the stator during rotation of the rotor; and
a plurality of composite cups respectively associated with the pistons and each of which includes a cylinder member with an annular surface defining a chamber in which the associated piston reciprocates with the spherical portion of the piston in sliding engagement with this surface of the cylinder member, a shoe member for generally closing the outer end of the cylinder member and having an arcuate bearing surface slidably engaging the annular race to constantly maintain the central axis of the chamber in a radially extending orientation relative to the annular race with the sliding interface between the piston and the cylinder member located in a plane normal to this axis so that the cup is radially balanced, and attachment means for securing the outer end of the cylinder member to the shoe member, the attachment means being located toward the inner end of the cylinder member from the extreme outer end thereof in a manner that allows a pressurized fluid within the cup to elastically deform the cylinder member independently of the shoe member radially with respect to the central axis of the chamber such that the piston and cylinder member elastically deform in a coordinated manner to thus prevent fluid leakage at their sliding interface.

2. A rotary fluid device comprising:
a housing defining an annular race;
a stator mounted on the housing and defining said ports;
a rotor mounted on the stator for rotational movement about an axis located eccentrically relativeo the central axis of the annular race;
a plurality of radial pistons extending outwardly from the rotor and having spherical portions at their outer ends, the pistons defining radially extending fluid passages whose outer ends are open and whose inner ends communicate with the fluid ports of the stator during rotation of the rotor; and
a plurality of composite cups respectively associated with the pistons and each of which includes an elongated cylinder member with an annular configuration and having an inner surface defining a chamber in which the piston reciprocates with the spherical portion of the piston in sliding engagement with this surface, the cylinder member having a varying wall thickness along its longitudinal length to control its elastic deformation characteristics when subjected to pressurized fluid within the chamber, a shoe member for generally closing the outer end of the cylinder member and having an arcuate bearing surface slidably engaging the annular race to constantly maintain the central longitudinal axis of the cylinder member in a radially extending orientation relative to the annular race with the sliding interface between the piston and the cylinder member located in a plane normal to this axis so that the cup is radially balanced, and attachment means for securing the outer end of the cylinder member to the shoe member, the attachment means being located toward the inner end of the cylinder member from the extreme outer end thereof in a manner that allows a pressurized fluid within the cup to elastically deform the cylinder member independently of the shoe member radially with respect to the central axis of the chamber such that the piston and cylinder member elastically deform in a coordinated manner to thus prevent fluid leakage at their sliding interface.

3. The rotary fluid device of claim 2 wherein the varying wall thickness of each cylinder member provides an annular rib intermediate the inner and outer ends of this member.

4. The rotary fluid device of claim 2 wherein a piston is less rigid than the cylinder member of the associated composite cup to provide a normal force at the sliding interface of these components under the impetus of pressurized fluid within the piston and composite cup arrangement and to thus substantially eliminate fluid leakage at this interface.

5. The rotary fluid device of claim 2 wherein the attachment means for securing the outer end of the cylinder member to the associated shoe member includes plastic deformation of a portion of one of the members over a portion of the other member to prevent movement of the cylinder member relative to the shoe member in a direction along the central longitudinal axis of the cylinder member but to allow elastic deformation of the cylinder member radially of this axis independently of the shoe member under the impetus of pressurized fluid within the composite cup.

6. The rotary fluid device of claim 2 wherein the attachment means for securing the outer end of each cylinder member to the associated shoe member utilizes an attachment fitting snapped over a portion of one of the members and engageable with a portion of the other member to prevent movement of the cylinder member relative to the shoe member in a direction along the central longitudinal axis of the cylinder member but to allow elastic deformation of the cylinder member radially of this axis independently of the shoe member under the impetus of pressurized fluid within the composite cup.

7. A rotary fluid device comprising:
a housing defining an annular race;
a stator mounted on the housing and defining fluid ports;
a rotor mounted on the stator for rotational movement about an axis located eccentrically relative to the central axis of the annular race;
a plurality of radial pistons extending outwardly from the rotor and having spherical portions at their outer ends, the pistons defining a radially extending fluid passages whose outer ends are open and whose inner ends communicate with the inlet and outlet ports of the stator during rotation of the rotor; and
a plurality of composite cups respectively associated with the pistons and each of which includes a cylinder member with an annular surface defining a chamber in which the associated piston reciprocates with the spherical portion of the piston in sliding engagement with this surface of the cylinder member, a shoe member for generally closing the outer end of the cylinder member and having an arcuate bearing surface engaging the annular race to constantly maintain the central axis of the chamber in a radially extending orientation relative to the annular race with the sliding interface between the piston and the cylinder member located in a plane normal to this axis so that the cup is radially balanced, attachment means for securing the outer end of the cylinder member to the shoe member, the attachment means being located toward the inner end of the cylinder member from the extreme outer end thereof in a manner that allows a pressurized fluid within the cup to elastically deform the cylinder member independently of the shoe member radially with respect to the central axis of the chamber so that the piston and cylinder member elastically deform in a coordinated manner to thus prevent fluid leakage at their sliding interface, and a displacement member mounted on the shoe member and extending radially inward relative to the annular race such that the volume of fluid within the piston and composite cup arrangement is reduced to reduce compressibility losses during operation of the fluid device.

8. A rotary fluid device according to claim 7 wherein the displacement member has a generally conical configuration with the base portion thereof mounted to the shoe member and with the apex portion thereof moving within the fluid passage of the associated piston during operation of the fluid device.

* * * * *

UNITED STATES PATENT OFFICE
CERTIFICATE OF CORRECTION

Patent No. 3,799,034  Dated March 26, 1974

Inventor(s) Robert J. Haglund and James A. Steele

It is certified that error appears in the above-identified patent and that said Letters Patent are hereby corrected as shown below:

Column 4, line 61, the word "reative" should read -- relative --. Column 6, line 1, the numeral "1" should be deleted. Column 6, line 55, the word "said" should read -- fluid --. Column 6, line 58, the letter "o" should read -- to --, and a space between relative and to.

Signed and sealed this 22nd day of October 1974.

(SEAL)
Attest:

McCOY M. GIBSON JR.
Attesting Officer

C. MARSHALL DANN
Commissioner of Patents